(12) United States Patent
Richter

(10) Patent No.: US 6,793,871 B1
(45) Date of Patent: Sep. 21, 2004

(54) METHOD AND DEVICE FOR PRODUCING A LARGE-VOLUME CONTAINER

(76) Inventor: Günter Richter, Johannistal 12, 57610 Altenkirchen (DE)

( * ) Notice: Subject to any disclaimer, the term of this patent is extended or adjusted under 35 U.S.C. 154(b) by 0 days.

(21) Appl. No.: 09/786,308

(22) PCT Filed: Jul. 16, 1999

(86) PCT No.: PCT/EP99/02213

§ 371 (c)(1),
(2), (4) Date: Mar. 2, 2001

(87) PCT Pub. No.: WO00/15409

PCT Pub. Date: Mar. 23, 2000

(30) Foreign Application Priority Data

Sep. 16, 1998 (DE) .......................................... 198 42 309

(51) Int. Cl.[7] .......................... B29C 49/04; B29C 49/10
(52) U.S. Cl. ....................... 264/531; 264/571; 264/573; 425/326.1; 425/388; 425/393; 425/528; 425/532
(58) Field of Search ................................ 264/531, 571, 264/573, 209.3; 425/388, 393, 326.1, 528, 532

(56) References Cited

U.S. PATENT DOCUMENTS

| | | | | |
|---|---|---|---|---|
| 3,100,317 A | * | 8/1963 | Perry | .......................... 264/531 |
| 3,278,665 A | * | 10/1966 | Harrison | ...................... 264/529 |
| 4,657,502 A | * | 4/1987 | Rydmann | ..................... 425/526 |
| 4,948,357 A | * | 8/1990 | Legge et al. | .................. 425/522 |
| 5,238,390 A | | 8/1993 | Dickinson | ..................... 425/529 |
| 5,318,740 A | | 6/1994 | Sadr et al. | ................... 264/506 |
| 5,346,665 A | * | 9/1994 | Watanabe et al. | ............. 264/516 |
| 5,474,734 A | | 12/1995 | Akazawa et al. | ............ 264/531 |

FOREIGN PATENT DOCUMENTS

JP          57-159623          10/1982

OTHER PUBLICATIONS

Patent Abstracts of Japan, 57 159623, Published Jan. 10, 1982, Shin Kobe Electric Mach Co Ltd.

* cited by examiner

*Primary Examiner*—Robert B. Davis
(74) *Attorney, Agent, or Firm*—Friedrich Kueffner

(57) ABSTRACT

The invention relates to a method for producing a large-volume cup-shaped or tub-shaped container made of a synthetic thermoplastic material, whereby a compact plastic, flexible hose-type preform (6) is extruded to obtain a given length and the container (1) is subsequently shaped. In order to carry out said operations with the aid of extremely simple extrusion devices and moulds, the extruded preform (6) is expanded to a given size and a core (2) is moved upwards into the expanded preform (6). The lower, open end of the expanded preform (6) is then clamped against the core (2) to provide a seal and the preform is shaped by air in order to form a container.

20 Claims, 2 Drawing Sheets

METHOD AND DEVICE FOR PRODUCING A LARGE-VOLUME CONTAINER

BACKGROUND OF THE INVENTION

1. Field of the Invention

The invention relates to a method for producing a large-volume, cup-shaped or tub-shaped container of thermoplastic material, wherein a hose-shaped pre-form of compact plastic material is extruded to a predetermined length, is widened by means of spreading elements to a predetermined size, and subsequently formed by forming air to the container, as well as to a device for performing the method.

2. Description of the Related Art

Transport and storage containers of compact plastic material, which are cup-shaped or tub-shaped, i.e., open at the top, are known which are initially produced by an extrusion method, in which a hose-shaped pre-form is produced, and a subsequent blowing method in a hollow, at least two-part mold, in which the hose-shaped pre-form is widened by blowing air and brought into contact with the inner wall of the hollow mold. The thus shaped container is then still closed at the top. By cutting off the upper cover area, the required container open at the top is then produced. This cutting step represents an additional working step which requires a special cutting device. Moreover, the upper edge of the container has a relatively minimal strength which is disadvantageous when the container is used as a protective container for another container.

A protective container for a large-volume container is known by which the aforementioned disadvantages are avoided.

This protective container has, however, a wall which is comprised of three layers wherein the inner layer is formed of a foamable plastic material. Such a wall, on the one hand, entails a high material consumption and requires, on the other hand, an extrusion device with relatively high capital investment. In addition to the extrusion device a mold is required which is complex and comprised of an inner mold and an outer mold and must withstand the foaming pressure of the inner layer. The method, as already mentioned above, can be performed only with a foamable inner layer. From a U.S. Pat. No. 5,474,734, a method for manufacturing hollow mold parts of thermoplastic material by a blowing process is known in which the finished mold parts are to have different wall thicknesses. In order to achieve this, two spreading elements, which can be supplied with a cooling liquid, are introduced from below into an extruded, hose-shaped pre-form with constant wall thickness and are moved apart. This reduces the wall thickness of the hose-shaped pre-form in the two areas which are not resting against the two spreading elements while the wall thickness remains constant in the area where the hose-shaped pre-form rests against the cooled spreading element. As soon as the desired degree of spreading has been reached, the two spreading elements are removed from the pre-form. Subsequently, a two-part blowing mold is closed about the pre-form and its lower and upper ends are squeezed together. When closing the mold, a blowing spike is introduced into the pre-form by means of which the pre-form is then blown to the finished, closed molded part.

SUMMARY OF THE INVENTION

The invention has thus the object to provide a method for producing a large-volume, cup-shaped or tub-shaped container of thermoplastic material which can be performed with an extremely simple extrusion device and molds.

As a solution to this object it is suggested according to the invention for the method of the aforementioned kind that a core is moved into the extruded, hose-shaped and widened pre-form from below and the lower free end of the widened pre-form is clamped sealingly against the core.

Such a method does not require a complicated and complex extrusion device for producing a large-volume, cup-shaped or tub-shaped container that is open at the top and has a wall of compact plastic material. The part of the mold which determines the final shape of the container can be of a simple design wherein in many cases a core as a shaping body is already sufficient. A special mold of at least two parts is then no longer needed. When manufacturing the container on a core, blowing air is exclusively used as the forming air. In the process of manufacturing in a mold, the forming air can be blowing air as well as a vacuum.

The invention will be explained in the following in more detail with the aid of embodiments illustrated in the drawing.

BRIEF DESCRIPTION OF THE DRAWINGS

It is shown in.

DESCRIPTION OF THE PREFERRED EMBODIMENTS

Figure 6:
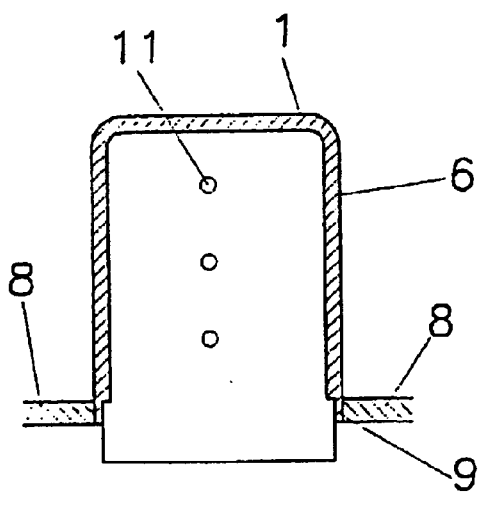
Figure 7:
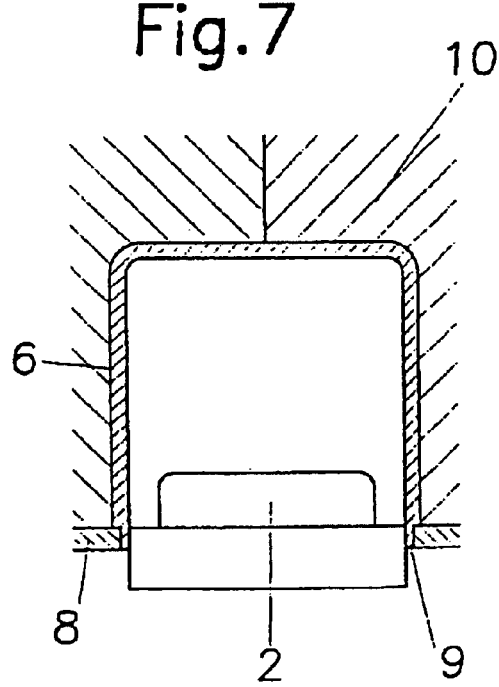

In the FIGS. 6 and 7 of the drawing, a container 1, produced in different ways, respectively, is shown in section in a very simplistic illustration. This container 1 can have specially designed ribs in the area of its lateral walls as well as can be we provided in the area of its bottom, which here is at the top, with specially shaped ribs which form a type of pallet-like bottom for the container. This container 1, which is formed in this connection of compact thermoplastic material, is completely open at its lower end according to FIGS. 6 and 7 so that the container has a cup-shaped or tub-shaped configuration which is then open at the top for its later use.

Figure 1:
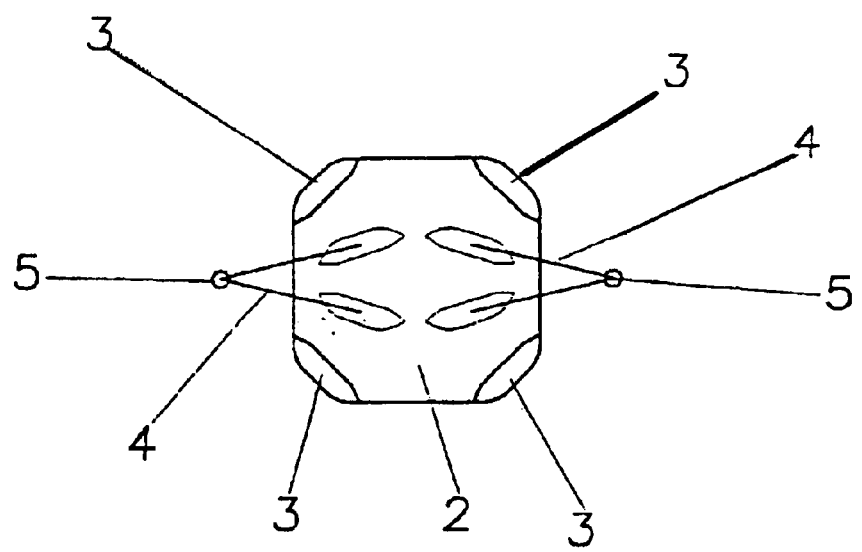
FIG. 1 a plan view onto a core serving as a shaping body for performing the inventive method, FIGS. 2 to 6 the individual method steps for producing a container, and FIG. 7 a variation of a method step.

The container 1 according to FIG. 6 is now produced by means of a core 2 which is illustrated in a plan view in the FIG. 1 of the drawing. This core 2, acting as a shaping body, has an approximately rectangular cross-section and is provided on all four corners with a respective spreading element 3 complementing the cross-section of the core 2, respectively, but movable independently of the core. The spreading elements 3 form a so-called spreading unit. Each spreading element 3 is supported by a pivot lever 4, only schematically illustrated, which is pivotable below the core 2 about axis 5. Two adjacently positioned pivot levers 4 with their spreading elements 3 are correlated with a common pivot axis 5. For the movement of the pivot levers 4 and thus of the spreading elements 3, drives, not illustrated in the drawing but known in the art, are correlated therewith by which the pivot levers 4 and thus the spreading elements 3 can be moved from their position on the corners of the core 2 inwardly into the position illustrated in FIG. 1, and back. In addition, each axis 5 has a lifting drive, not illustrated but known in the art, correlated therewith by which the pivot lever 4 and thus the spreading elements 3 can be lifted into a predetermined position which will be explained in the following. If needed, both axes 5 can have one common lifting drive correlated therewith. Also, the core 2 can be lifted by means of a lifting drive. In this connection, the lifting drives are, for example, mounted on a common frame.

Figure 2:
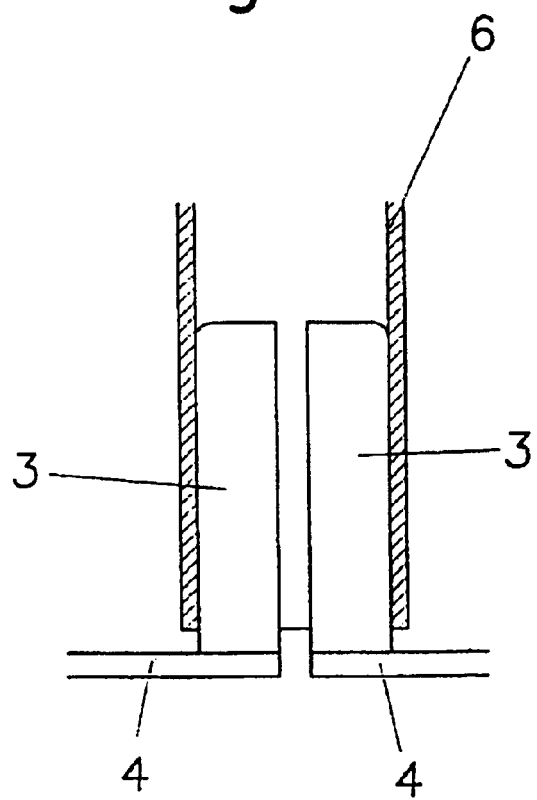
Figure 3:
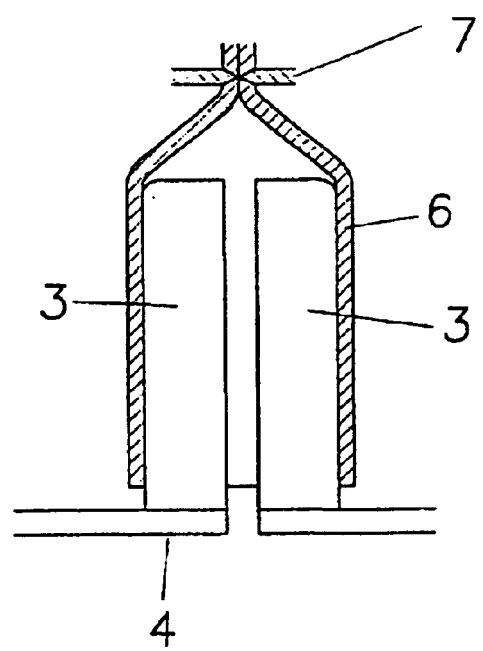
Figure 4:
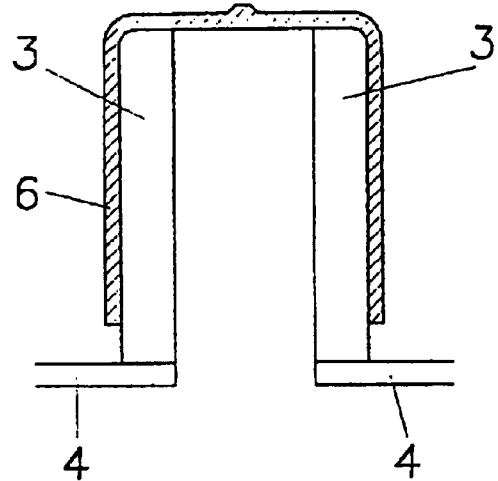

For the manufacture of the container 1 according to FIG. 6 it is now assumed that the core 2 is lowered and the spreading elements 3 have assumed their inner position within but above the core 2. This means that the spreading elements 3 are pivotable inwardly by means of their pivot arms 4 and now assume their inner position. In this position of the spreading elements 3, a hose-shaped pre-form 6 is now continuously or discontinuously moved from above by means of an extruder, not illustrated, about the inwardly moved spreading elements 3, as illustrated in FIG. 2. This hose-shaped pre-form 6 has, for example, a single-layer wall of compact plastic material. The pre-form 6 is now extruded in a predetermined length illustrated in FIG. 2 about the inwardly moved spreading elements 3. In this connection, the four spreading elements 3 are surrounded by the hose-shaped pre-form 6. As soon as the pre-form 6 has the required length, it is then squeezed together by blades 7, only schematically shown, or a so-called hose closure and welded (FIG. 3). Now the spreading elements 3 are moved outwardly by means of their pivot arms 4 to such an extent that the hose-shaped pre-form 6 is widened. The degree of spreading is predetermined to be so large that the core 2 can be moved into the widened pre-form 6 according to FIG. 4. This means that the core 2 is lifted. By means of special clamping elements 8 the extruded pre-form 6 is now pressed in the area of its lower open end against the core 2 so that an extremely narrow squeezed rim 9 is produced, as illustrated on an enlarged scale in FIG. 6 of the drawing.

The core 2 is now provided at its surface with relatively small channels 11 which open into a central channel. This central channel is connected to a vacuum line. By means of forming air, in this case it is the application of vacuum to the channels 11, the wall of the pre-form 6 is now brought into contact at the surface of the core 2. Accordingly, the container 1 of FIG. 6 is formed. After cooling and hardening of the container 1, the core 2 can be removed therefrom and the extremely thin squeezed rim 9 can be cut by means of a knife.

In the described method the container 1 is produced without using an outer mold. This means, however, that the thickness of the wall of the container 1 does not necessarily have a uniform thickness everywhere. With a corresponding control of the extrusion process it is now possible to form the thickness of the wall of the hose-shaped, extruded pre-form 6 differently so that the wall of the finished container 1 in the individual areas of its height can also be different. For the removal of the core 2 from the container 1, it is now required to hold the container 1 on a stripper bar and to move the core 2 together with the spreading elements 3 again into the initial position. The container 1 is now completely free and can be removed from the device.

Figure 5:
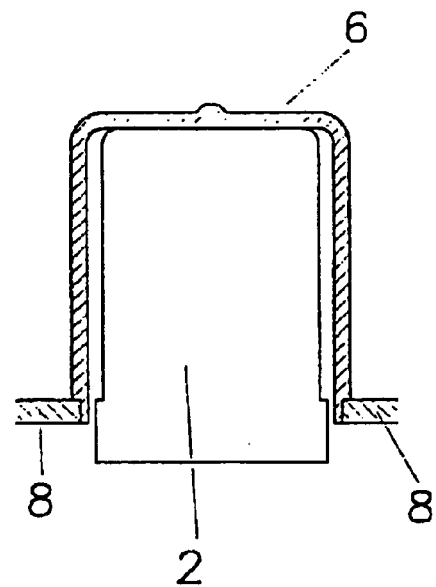

In the manufacture of the container 1 of FIG. 7, the shape of the container 1 is not only determined by the core 2 but by a two-part outer mold 10. The core 2 accordingly can be designed considerably shorter. The short core 2 with the pre-form 6 according to FIG. 5 is moved into the outer mold 10 and is clamped therein by means of clamping elements 8 on the core 2. This results also in a squeezed rim 9. After closing the hollow mold 10 about the core 2, blowing air as shaping air is introduced through the core 2 into the hose-shaped pre-form 6 which causes the hose-shaped pre-form 6 to contact the inner wall of the hollow mold 10. After cooling of the container 1, the squeezed rim 9 is again cut by a knife and the hollow mold 10 as well as the core 2 are removed.

In a variation of the explained embodiments, it is possible to use only two, three or more than four spreading elements 3. In the case of two spreading elements 3 they must be shell-shaped and can be hinged or foldable. The cross-section of the spreading elements 3 can otherwise be as desired. It is decisive in this connection that the spreading elements 3 are able to widen the pre-form 6, which is smaller in cross-section, or to enlarge its peripheral contour such that a core 2 can be introduced whose cross-section is greater than the original cross-section of the extruded pre-form 6. Moreover, it is possible to design the core 2 itself to be collapsible so that the spreading elements 3 can be eliminated and the core 2 forms the so-called spreading unit.

What is claimed is:

1. A method for producing a large-volume, cup-shaped or tub-shaped container of thermoplastic material, the method comprising:
    extruding a hose-shaped pre-form of compact plastic material to a predetermined length,
    initially widening the extruded pre-form by a predetermined amount,
    subsequently moving a core from below into the widened pre-form,
    subsequently clamping the widened pre-form at a lower free end thereof sealingly against the core, such that an opening of the container is formed, wherein an area of the opening approximately is equal to a cross-sectional area of the container,
    subsequently shaping the pre-form by means of shaping air into the container, and
    clamping the pre-form by means of clamping elements at the core so as to form a squeezed rim at the pre-from.

2. A method for producing a large-volume, cup-shaped or tub-shaped container of thermoplastic material, the method comprising:
    extruding a hose-shaped pre-form of compact plastic material to a predetermined length,
    initially widening the extruded pre-form by a predetermined amount,
    subsequently moving a core from below into the widened pre-form,
    subsequently clamping the widened pre-form at a lower free end thereof sealingly against the core, such that an opening of the container is formed, wherein an area of the opening approximately is equal to a cross-sectional area of the container,
    subsequently shaping the pre-form by means of shaping air into the container, wherein the core is configured as a shaping body, further comprising forming the container by means of a vacuum on the core.

3. The method according to claim 1, wherein the core is configured as a shaping body, further comprising forming the container by means of a vacuum or blowing air on a two-part hollow mold surrounding the core at a spacing.

4. The method according to claim 1, further comprising widening the extruded pre-form by at least two rod-shaped spreading elements.

5. A method for producing a large-volume, cup-shaped or tub-shaped container of thermoplastic material, the method comprising:
    extruding a hose-shaped pre-form of compact plastic material to a predetermined length,
    initially widening the extruded pre-form by a predetermined amount,
    subsequently moving a core from below into the widened pre-form, subsequently clamping the widened pre-form at a lower free end thereof sealingly against the core, such that an opening of the container is formed, wherein an area of the opening approximately is equal to a cross-sectional area of the container, subsequently shaping the pre-form by means of shaping air into the container, further comprising widening the extruded pre-form by the core.

6. A device for producing a large-volume, cup-shaped or tub-shaped container of thermoplastic material, the device comprising an extrusion head for forming a hose-shaped pre-form of a single-layer compact plastic material, a spreading unit mounted below the pre-form and movable from below into the pre-form by a relative movement, and a core movable from below into the pre-form after the pre-form has been widened by the spreading unit, wherein the core comprises at least one two-part clamping element, wherein the core can be loaded with a vacuum, and wherein the core is configured to form an opening of the container, wherein an area of the opening is approximately equal to a cross-sectional area of the container.

7. The device according to claim 6, wherein the spreading unit comprises at least two spreading elements that can be moved apart.

8. The device according to claim 7, wherein the spreading elements have different cross-sectional shapes.

9. The device according to claim 7, wherein the spreading elements are formed of parts of the shaping body.

10. The device according to claim 7, wherein the spreading elements are configured to be radially movable.

11. The device according to claim 7, wherein the spreading elements are configured to be pivotable.

12. The device according to claim 6, wherein the spreading unit is formed by a spreadable or foldable core.

13. A device for producing a large-volume, cup-shaped or tub-shaped container of thermoplastic material, the device comprising an extrusion head for forming a hose-shaped pre-form of a single-layer compact plastic material, a spreading unit mounted below the pre-form and movable from below into the pre-form by a relative movement, and a core movable from below into the pre-form after the pre-form has been widened by the spreading unit, wherein the core comprises at least one two-part clamping element and a hollow mold loadable with vacuum or blowing air and surrounding the core at a spacing, wherein the core is configured to form an opening of the container, wherein an area of the opening is approximately equal to a cross-sectional area of the container.

14. The device according to claim 13, wherein the spreading unit comprises at least two spreading elements that can be moved apart.

15. The device according to claim 14, wherein the spreading elements have different cross-sectional shapes.

16. The device according to claim 14, wherein the spreading elements are formed of parts of the shaping body.

17. The device according to claim 14, wherein the spreading elements are configured to be radially movable.

18. The device according to claim 14, wherein the spreading elements are configured to be pivotable.

19. The device according to claim 13, wherein the spreading unit is formed by a spreadable or foldable core.

20. The method according to claim 1, further comprising cutting the squeezed rim after cooling of the container.

* * * * *